US007762394B2

(12) United States Patent
Bradford et al.

(10) Patent No.: US 7,762,394 B2
(45) Date of Patent: Jul. 27, 2010

(54) CARTONS WITH DISPENSING FEATURES

(75) Inventors: Paul Bradford, Staple Hill (GB); Steve Gould, Stoke Gifford (GB)

(73) Assignee: Graphic Packaging International, Inc., Marietta, GA (US)

( * ) Notice: Subject to any disclaimer, the term of this patent is extended or adjusted under 35 U.S.C. 154(b) by 839 days.

(21) Appl. No.: 11/497,049

(22) Filed: Aug. 1, 2006

(65) Prior Publication Data

US 2007/0029220 A1 Feb. 8, 2007

Related U.S. Application Data

(60) Provisional application No. 60/704,837, filed on Aug. 2, 2005.

(51) Int. Cl.
B65D 75/00 (2006.01)
(52) U.S. Cl. ............... 206/427; 206/45.26; 206/429; 229/122; 229/244; 229/242
(58) Field of Classification Search ......... 206/427–431, 206/435, 45.24, 45.26; 229/231, 244, 243, 229/122, 240, 242
See application file for complete search history.

(56) References Cited

U.S. PATENT DOCUMENTS

| 1,416,465 A | 5/1922 | Harvey |
| 1,434,165 A | 10/1922 | Ten Eyck |
| 1,732,226 A | 10/1929 | Darragh |
| 1,862,685 A | 6/1932 | Kennett |
| 1,889,625 A | 11/1932 | Barter |
| 1,909,472 A | 5/1933 | Keppler |
| 2,052,675 A | 9/1936 | Tanner |
| 2,294,965 A | 9/1942 | Davidson |
| 2,312,595 A | 3/1943 | Smith |
| 3,178,242 A | 4/1965 | Ellis et al. |
| 4,030,596 A | 6/1977 | Snyder et al. |
| 4,331,231 A | 5/1982 | Boyle |
| 4,433,778 A | 2/1984 | Maio et al. |
| 5,375,702 A | 12/1994 | Fiallo |
| 5,878,947 A | 3/1999 | Hoy et al. |
| 6,227,367 B1 | 5/2001 | Harrelson et al. |
| 6,578,736 B2 | 6/2003 | Spivey |
| 6,866,185 B2 | 3/2005 | Harrelson |
| 6,902,104 B2 | 6/2005 | Holley, Jr. et al. |
| 7,004,897 B2 * | 2/2006 | Spivey, Sr. ............... 493/59 |
| 7,147,143 B2 * | 12/2006 | Cargile ............... 229/122 |
| 7,296,731 B2 * | 11/2007 | Auclair et al. ............ 229/242 |
| 2004/0238611 A1 | 12/2004 | Sutherland |

FOREIGN PATENT DOCUMENTS

| FR | 583086 | 1/1925 |
| WO | WO 2004/087507 A2 | 10/2004 |
| WO | WO 2005/014421 A1 | 2/2005 |

* cited by examiner

Primary Examiner—Jacob K Ackun, Jr.
Assistant Examiner—Robert Poon
(74) Attorney, Agent, or Firm—Womble Carlyle Sandridge & Rice, PLLC

(57) ABSTRACT

Cartons have dispensers that allow ease of access to articles accommodated within the cartons. A carton has a back panel, a top panel, a front panel, a bottom panel, a first end panel, a second end panel, and a dispenser/stand pattern disposed in the top panel and the front panel and defining a dispenser/stand. The carton is capable of being placed in a dispensing configuration in which the dispenser/stand provides a dispenser opening and supports the carton in an inclined position. The dispenser/stand is connected to the front panel when the dispenser/stand supports the carton in an inclined position.

34 Claims, 13 Drawing Sheets

CARTONS WITH DISPENSING FEATURES

RELATED APPLICATION

This application claims the benefit of U.S. Provisional Patent Application No. 60/704,837, filed Aug. 2, 2005, the entire contents of which are hereby incorporated by reference.

BACKGROUND

Dispensing cartons are known. Conventional cartons typically include a pattern of tear lines defining a removable section of the carton. When the section is removed, articles can be removed through the resultant dispenser opening. Conventional dispensing cartons, however, often fail to provide ease of dispensing of articles held within the carton. They may also fail to sufficiently retain articles within the carton once the carton has been opened, or may lack flexibility in the number of positions from which they may dispense articles.

SUMMARY

According to a first embodiment of the invention, a carton comprises a back panel, a top panel, a front panel, a bottom panel, a first end panel, a second end panel, and a dispenser/stand pattern disposed in the top panel and in the front panel. The dispenser/stand panel defines a dispenser/stand. The carton may be placed in a dispensing configuration in which the dispenser/stand provides a dispenser opening and supports the carton in an inclined position.

According to the first embodiment, the carton provides ease of access to containers accommodated within the carton once the carton is placed in its dispensing configuration. The dispenser/stand elevates the open end of the carton so that articles accommodated in the carton can be easily viewed and withdrawn from the carton. The elevated open end also prevents articles from inadvertently exiting the carton through the open end.

According to a second embodiment of the invention, a carton comprises a back panel, a top panel, a front panel, a bottom panel, a first end panel, a second end panel, a first diamond corner panel between the top panel and the first end panel, a second diamond corner panel between the top panel and the second end panel, and a dispenser pattern disposed in the top panel and in the front panel and defining a dispenser. The carton may be placed in a dispensing configuration in which the dispenser provides a dispenser opening.

According to the second embodiment, the carton provides ease of access to containers accommodated within the carton once the carton is placed in its dispensing configuration. The carton can be utilized in separate dispensing configurations, which is convenient if the storage space for the carton is limited in one or more dimensions. The opened carton also allows a consumer a view of substantially all of the carton contents.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

The present invention generally relates to cartons for accommodating and dispensing articles. The articles can include beverage containers such as, for example, beverage bottles, PET containers, wine bottles, or other containers such as those used in packaging foodstuffs. For the purposes of illustration and not for the purpose of limiting the scope of the present invention, the following detailed description describes bottle beverage containers as disposed within the carton embodiments.

Figure 1:
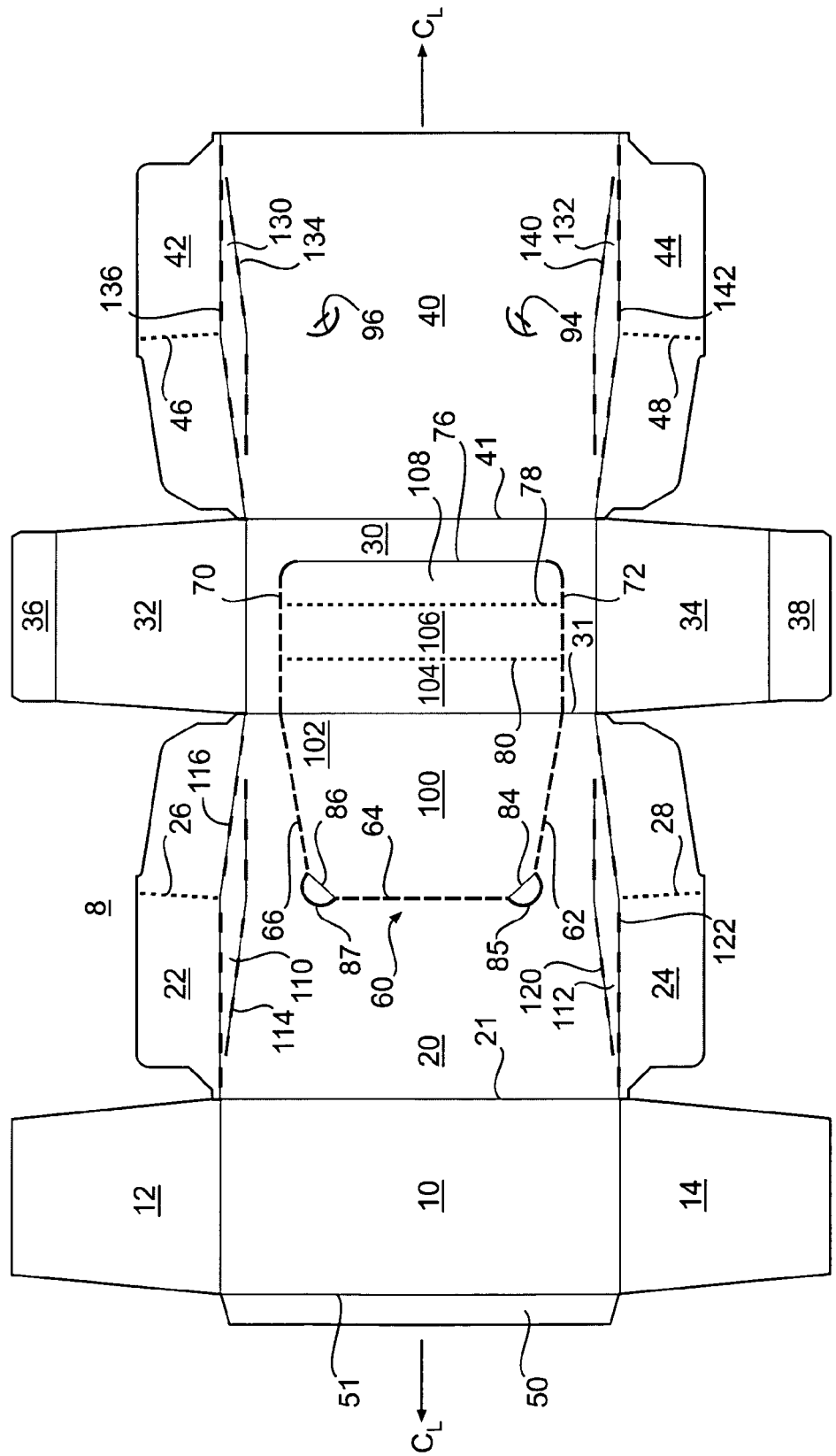
FIG. 1 is a plan view of a blank used to form a carton according to a first embodiment of the invention.

FIG. 1 is a plan view of an exterior side of a blank 8 used to form a carton 150 (illustrated in FIG. 5) according to a first embodiment of the present invention. The blank 8 comprises a back panel 10 foldably connected to a top panel 20 at a first transverse fold line 21, a front panel 30 foldably connected to the top panel 20 at a second transverse fold line 31, and a bottom panel 40 foldably connected to the front panel 30 at a third transverse fold line 41. An adhesive flap 50 can be foldably connected to the back panel 10 at a fourth transverse fold line 51. The blank 8 may have longitudinal symmetry as indicated by the longitudinal centerline $C_L$.

The back panel 10 is foldably connected to first and second back end flaps 12, 14. The top panel 20 is foldably connected to first and second top end flaps 22, 24. The front panel 30 is foldably connected to first and second front end flaps 32, 34. The first and second front end flaps 32, 34 may include foldably attached adhesive flaps 36, 38. The bottom panel 40 is foldably connected to first and second bottom end flaps 42, 44. When the carton 150 is assembled (FIG. 5), the end flaps 12, 22, 32, 42 close a first end of the carton 150, and the end flaps 14, 24, 34, 44 close a second end of the carton 150. The end flaps 12, 22, 32, 42 extend along a first marginal area of the blank 8, and the end flaps 14, 24, 34, 44 extend along a second marginal area of the blank 8. The top end flaps 22, 24 can be foldable at oblique fold lines 26, 28, respectively. The bottom end flaps 42, 44 can be foldable at oblique fold lines 46, 48, respectively.

First and second diamond corner panels 110, 112 may be formed on either side of the top panel 20. The first corner panel 110 can have a general diamond shape defined by opposed dogleg fold lines 114, 116. The second corner panel 112 can also have a diamond shape, defined by opposed dogleg fold lines 120, 122. Third and fourth diamond corner panels 130, 132 may be formed on either side of the bottom panel 40. The third corner panel 130 can have a general diamond shape defined by opposed dogleg fold lines 134, 136. The fourth corner panel 132 can also have a diamond shape, defined by opposed dogleg fold lines 140, 142.

Figure 10:
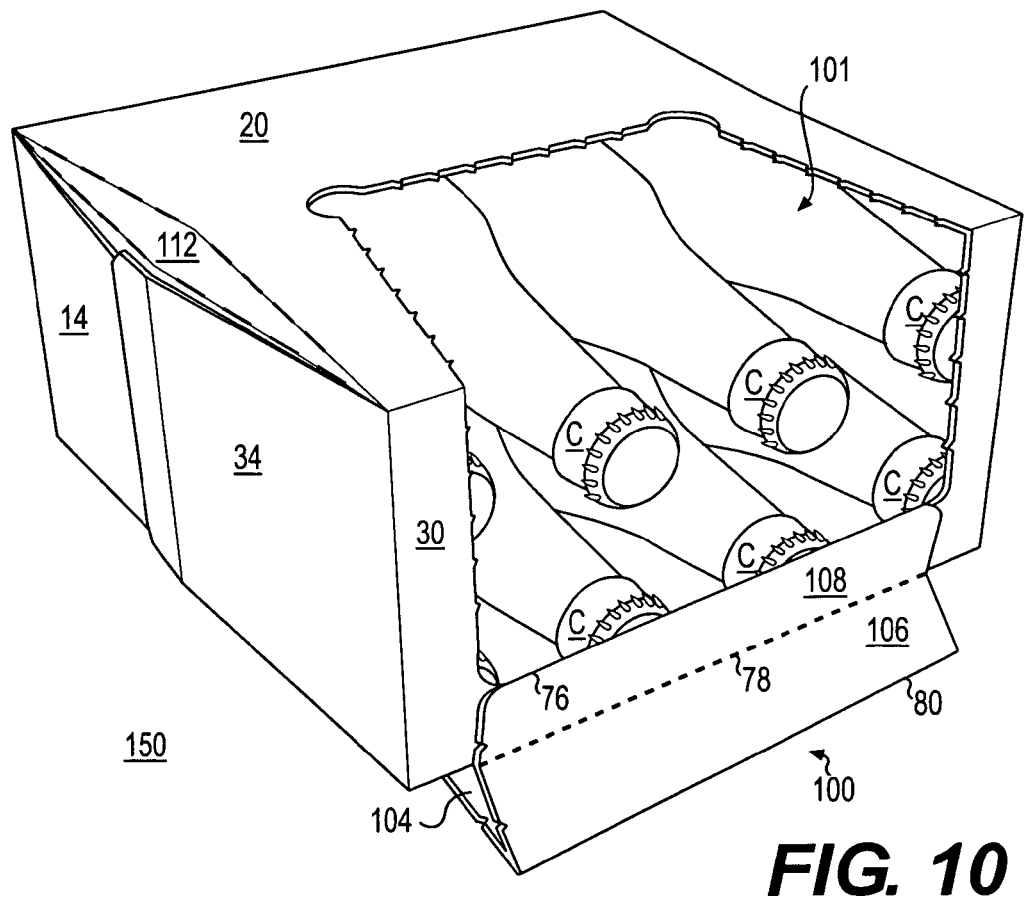
Figure 11:
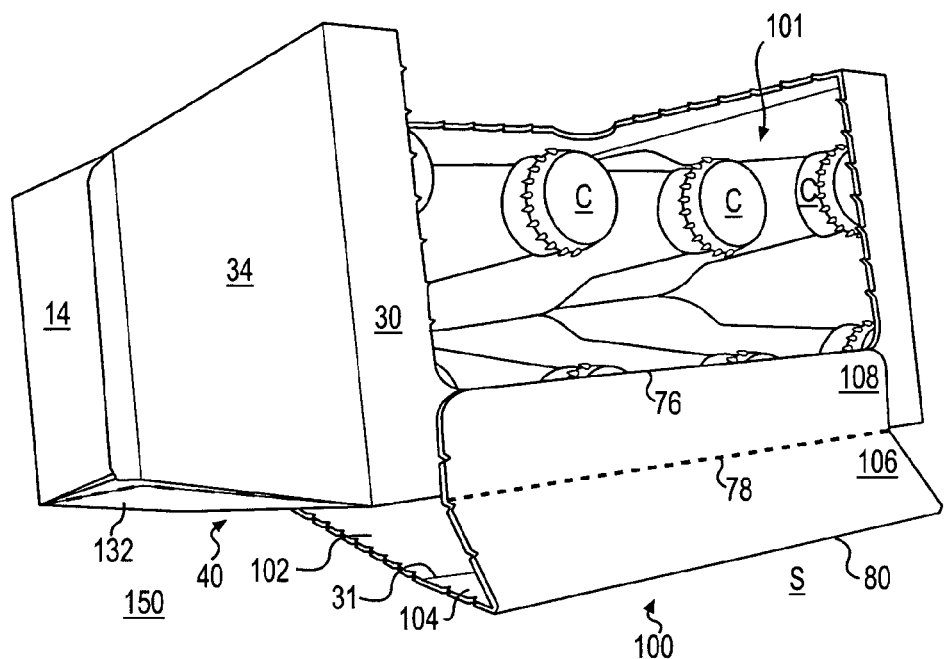
FIGS. 11 and 12 illustrate the first carton embodiment in the dispensing configuration.
Figure 12:
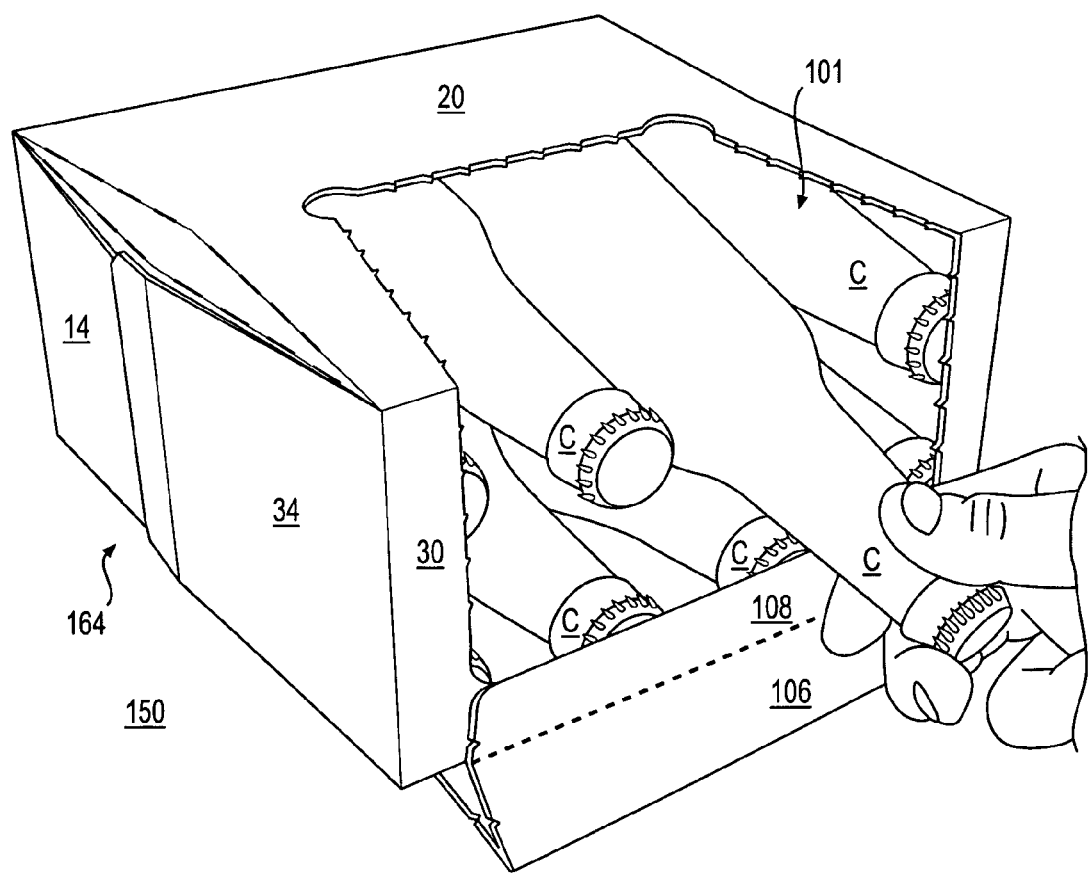

According to one aspect of the invention, the blank 8 may include a dispenser/stand pattern. For example, the blank 8 illustrated in FIG. 1 includes a dispenser/stand pattern 60 that defines a dispenser/stand 100 in the erected carton 150 (illustrated in FIG. 5). When placed in the dispensing configuration, the dispenser/stand 100 provides a dispenser opening through which articles can be dispensed and also supports the carton 150 in an inclined position (FIGS. 10-12). In the illustrated embodiment, the dispenser/stand pattern 60 includes first, second, and third tear lines 62, 64, 66 in the top panel 20. Fourth and fifth longitudinal tear lines 70, 72 may extend through the front panel 30. The first through fifth tear lines 62, 64, 66, 70, 72 may be, for example, tear lines that allow partial separation of the dispenser/stand 100 from a remainder of the carton 150. In the exemplary embodiment illustrated in FIGS. 1-13, the tear lines 62, 64, 66, 70, 72 are tear lines having the form of cut-crease lines, although other breachable lines of disruption may be used.

The dispenser/stand pattern 60 may also include first, second, and third transverse fold lines 76, 78, 80 that extend through the front panel 30 between the fourth and fifth tear lines 70, 72 of the dispenser/stand pattern 60. The first through third transverse fold lines 76, 78, 80 and the transverse fold line 31 may be generally parallel to one another, and in part define a top dispenser/stand panel 102, and first, second and third front dispenser/stand panels 104, 106, 108 in the dispenser/stand 100. In the exemplary embodiment illustrated in FIGS. 1-13, the fold lines 78, 80 are cut/space lines, and the fold lines 31, 76 are crease lines. Other types of fold lines, however, may be formed in the blank 8.

The dispenser/stand pattern 60 may also include at least one tab cutout to assist in removing the dispenser/stand after the carton has been erected. For example, in the embodiment illustrated in FIG. 1, first and second tabs 84, 86 defined by first and second curved tab cutouts 85, 87 may be formed at the junctures of the first through third tear lines 62, 64, 66. Those of ordinary skill in the art will understand that a variety of shapes may be employed to form the tab cutouts, e.g., circular, oval, triangular, or rectangular. As shown in FIG. 1, corresponding first and second retaining features 94, 96 may be formed in the bottom panel 40. The retaining features 94, 96 may be formed from a cut line or cut lines sized and shaped to receive and retain the first and second tabs 84, 86, respectively, when the erected carton 150 is in its dispensing configuration.

An exemplary method erecting the carton 150 is discussed below with reference to FIGS. 1-4.

Figure 2:
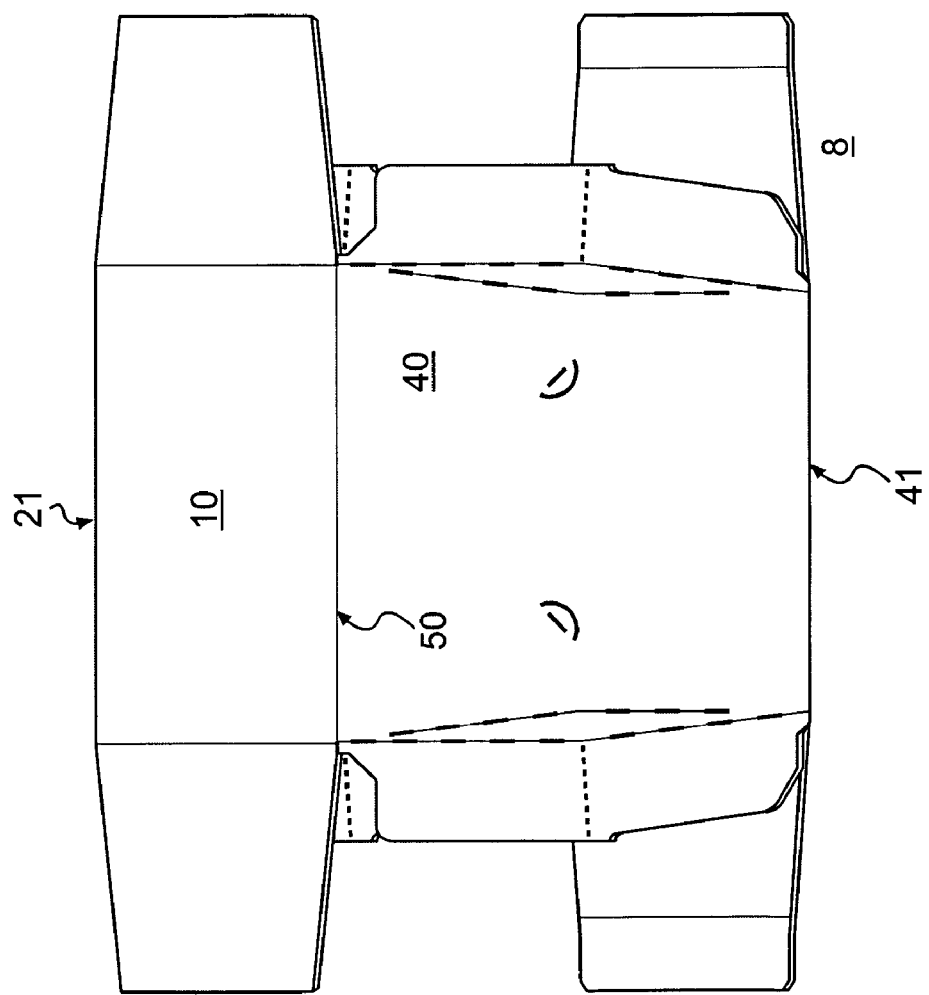
FIGS. 2-4 are perspective views illustrating erection of the carton according to the first embodiment.

Referring to FIG. 2, the blank 8 is folded about the transverse fold lines 41 and 21, and the adhesive panel 50 is adhered to the bottom panel 40. Adhesion may be accomplished by any method known to those of ordinary skill in the art. Glue, for example, may be used to adhere the panels 40, 50.

Figure 3:
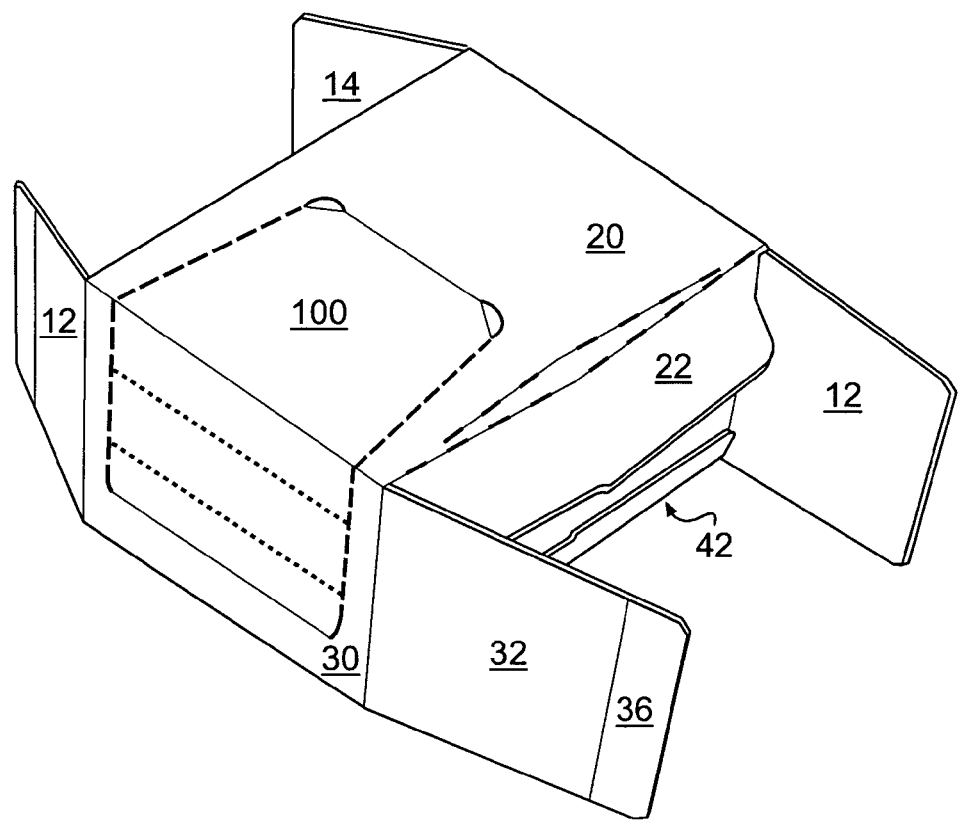

Referring to FIG. 3, the blank 8 is partially opened so that it has a generally tubular form. The end flaps 22, 42 are folded inwardly so that they partially cover a first open end of the tubular blank form. The end flaps 12, 32 are then folded over the end flaps 22, 42. One or more of the first end flaps 12, 22, 32, 42 can be adhesively secured to close the first end of the tubular form. For example, the adhesive flap 36 can be adhered to the first back end flap 12. The interior sides of the end flaps 12, 32 may alternatively or in addition be adhered to the exterior sides of the end flaps 22, 42. The second end of the carton can be closed in a similar manner by the second end flaps 14, 24, 34, 44.

Figure 4:
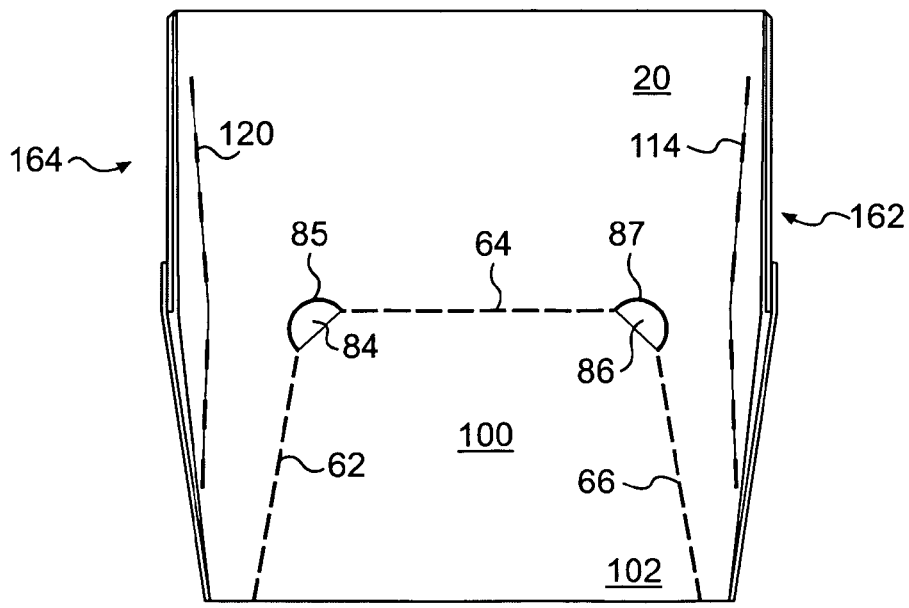
Figure 5:
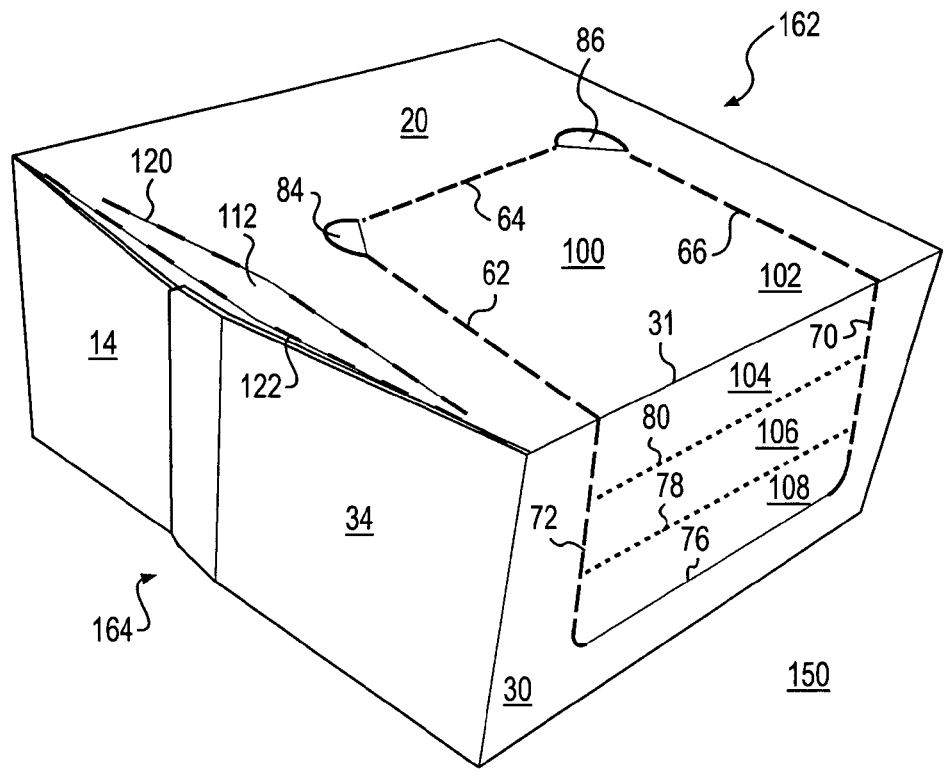
FIG. 5 is a perspective view of the first carton embodiment.

Referring to FIG. 4, the first end flaps 12, 22, 32, 42 form a first end panel 162, and the second end flaps 14, 24, 34, 44 form a second end panel 164. Containers C (illustrated in FIG. 10) can be loaded into the partially formed carton at any time before closing both ends of the carton. FIG. 5 is a perspective view of the erected carton 150 before the carton is placed in its dispensing configuration. The dispenser/stand 100 extends across the top panel 20 and the front panel 30.

An exemplary method of opening and placing the carton into a dispensing configuration is discussed below with reference to FIGS. 6-12.

Figure 6:
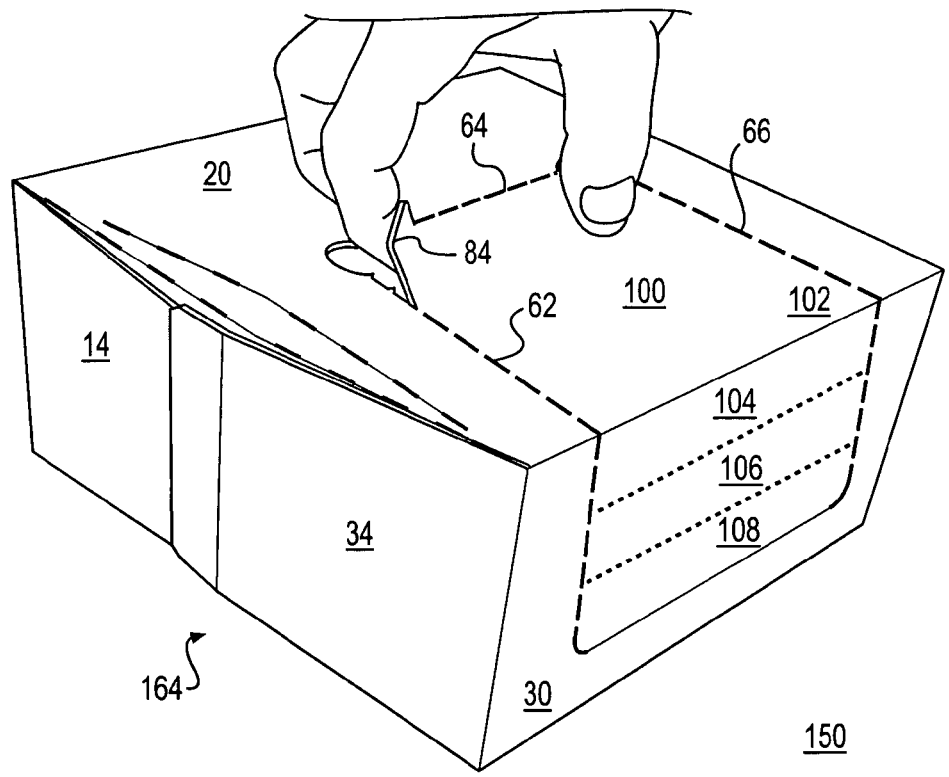
FIGS. 6-10 illustrate the first carton embodiment being placed in a dispensing configuration.
Figure 7:
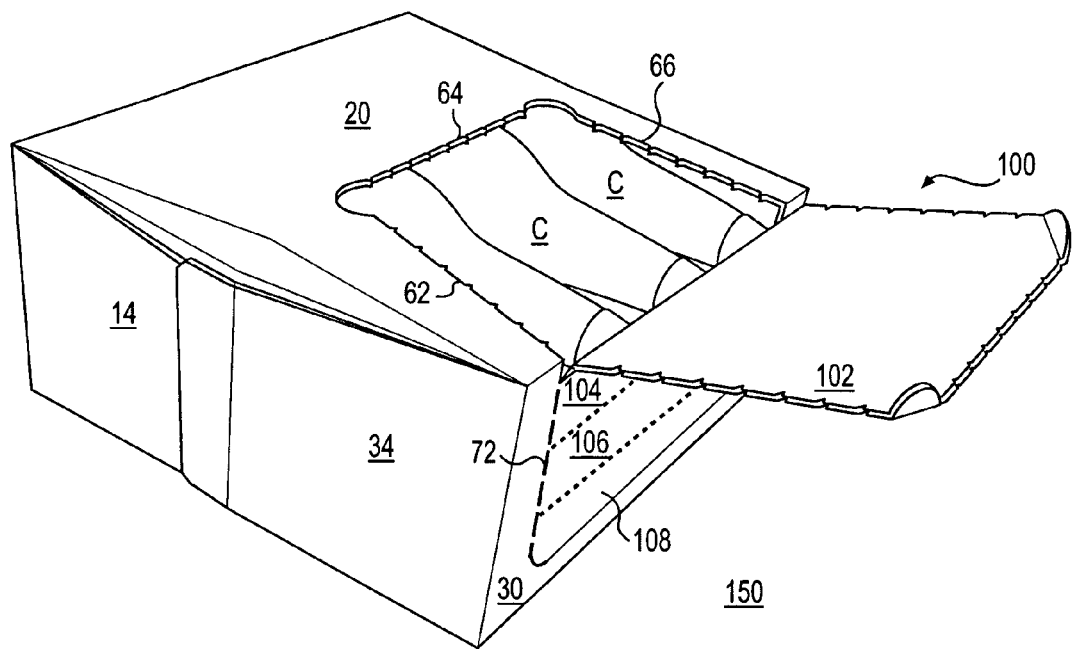
Figure 8:
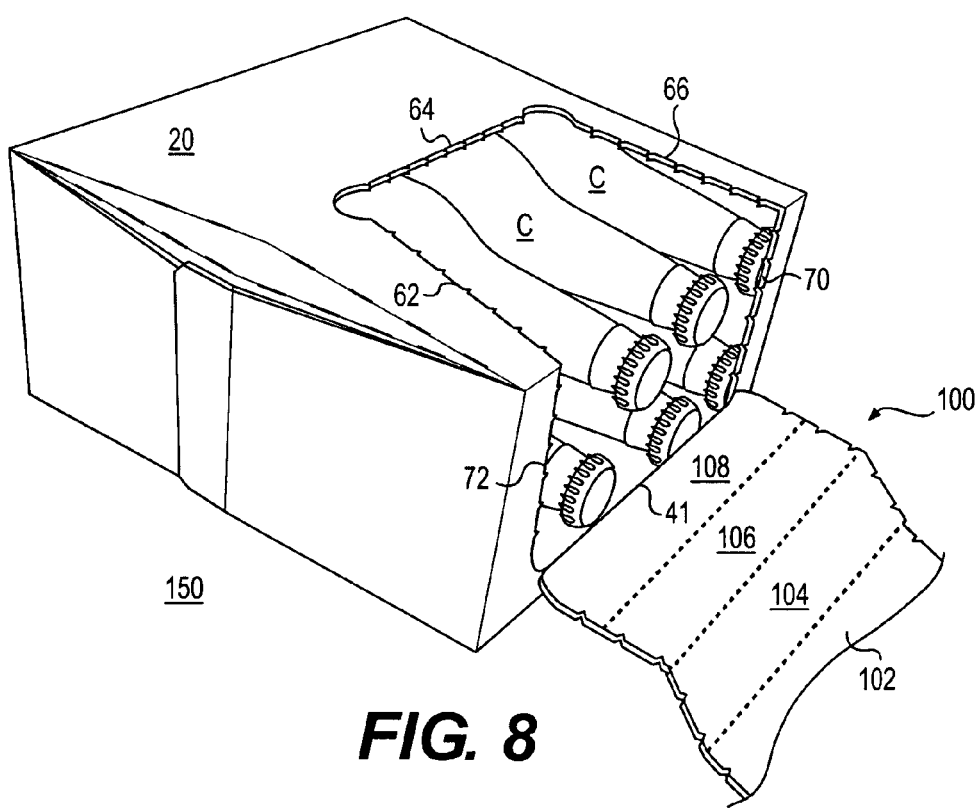

Referring to FIG. 6, an edge of the dispenser/stand 100 may be grasped and pulled upwardly from the top panel 20. The dispenser/stand 100 may be grasped, for example, at either or both of the tabs 84, 86, and the dispenser/stand pattern 60 (illustrated in FIG. 1) may be torn along the first through third tear lines 62, 64, 66 to tear away the top panel 102 of the dispenser/stand 100 from the remainder of the top panel 20. FIG. 7 illustrates the top panel 102 of the dispenser/stand 100 separated from the top panel 20. Referring to FIG. 8, the dispenser/stand 100 is further torn along the fourth and fifth tear lines 70, 72 of the dispenser/stand pattern 60 until the dispenser/stand 100 is foldably connected to the front panel 30 at the fold line 41.

Figure 9:
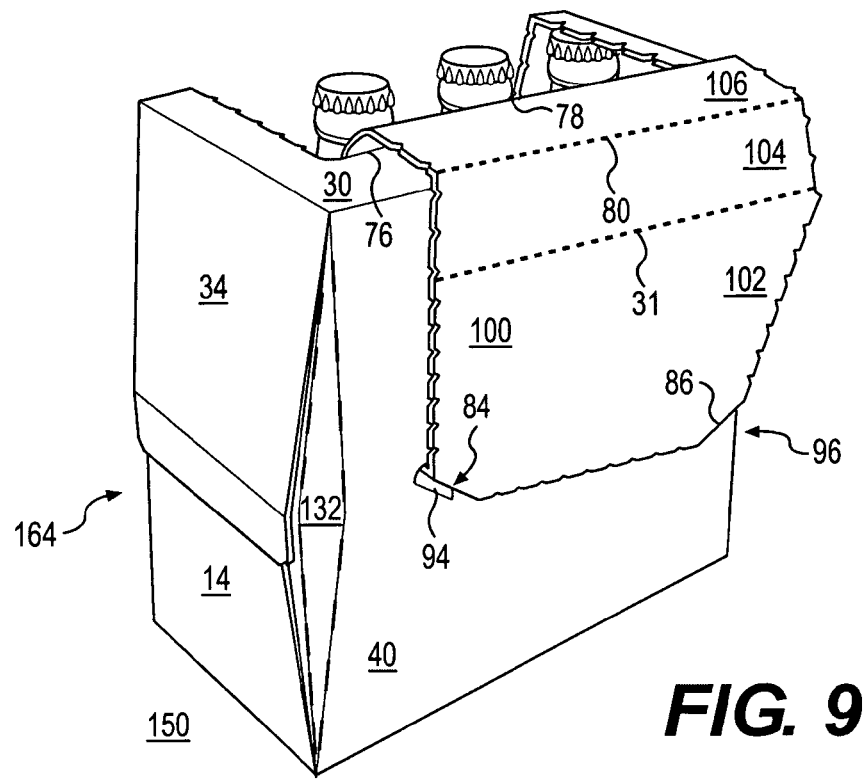

Referring to FIG. 9, the carton 150 is placed on its back panel 10 and the dispenser/stand 100 is folded back so that it partially overlaps the bottom panel 40. In this position, the first and second tabs 84, 86 may be brought into engagement with their respective retention features 94, 96 in the bottom panel 40. The tabs 84, 86 are pressed into the slits of their corresponding retention features 94, 96 to secure the dispenser/stand 100 in its folded back position. Referring to FIG. 10, the carton 150 may then be pivoted so that it is supported in an upwardly tilted or inclined position by the dispenser/stand 100. The second front panel 106 of the dispenser/stand 100 may be pushed inwardly so that the dispenser/stand 100 folds inwardly at the fold line 78, pressing the third front panel 108 against the remaining portion of the front panel 30. Partial separation of the dispenser/stand 100 from the carton 150 leaves a dispenser opening 101 in the carton. The dispenser/stand 100 is now in an inclined dispensing configuration from which containers C can be dispensed from the dispenser opening 101.

FIG. 11 illustrates the dispenser/stand 100 supporting the carton 150 in its inclined dispensing position with the bottom panel 40 elevated from a supporting surface S by the dispenser/stand 100. FIG. 12 illustrates a container C being dispensed from the carton 150 through the dispenser opening 101. The exemplary containers C in the carton 150 are bottles having long axes extending generally parallel to the top and bottom panels 20, 40. The bases of the containers C are adjacent to the back panel 10, and the tops of the containers are adjacent to the front panel 30. The long axes of the containers C are also generally aligned with the length of the dispenser opening 101 so that the containers C are easily withdrawn through the dispenser opening 101.

According to the present embodiment, the carton 150 provides ease of access to containers C held within the carton once the carton 150 is placed in its dispensing configuration. The dispenser/stand 100 elevates the open end of the carton 150 so that containers C can be easily viewed and withdrawn from the carton. The angle of inclination of the carton 150 ensures that the containers C do not accidentally exit the carton 150 through the dispenser opening 101. The opened carton 150 also allows a consumer a view of substantially all of the carton contents.

The embodiment depicted in FIGS. 1-13 includes a lip formed on the carton 150 between the first fold line 76 and the fourth transverse fold line 41. However, the carton can be constructed without the lip. Specifically, the first fold line 76 could extend to be co-extensive with the fourth transverse fold line 41.

As shown in the embodiment depicted in FIGS. 1-12, the carton 150 accommodates eight beverage bottles arranged in two rows and four columns. The number of columns and rows can be varied, for example, to accommodate varying numbers or arrangements of containers C. Alternative container forms may also be accommodated within the carton 150. For example, cans may also be accommodated within a carton according to the present invention.

Figure 13:
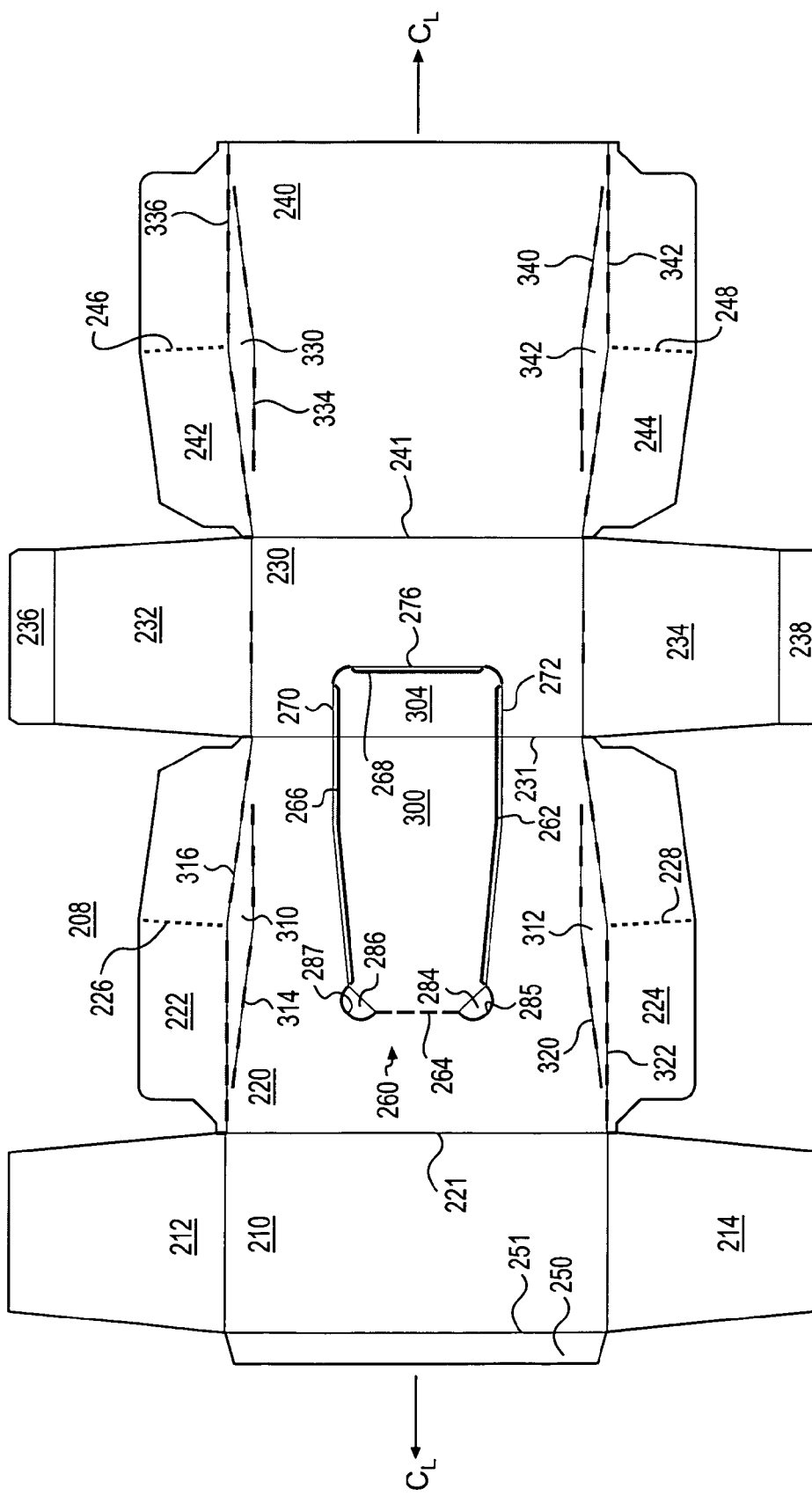
FIG. 13 is a plan view of a blank used to form a carton according to a second embodiment of the invention.

FIG. 13 is a plan view of a blank used to form a carton 350 (illustrated in FIG. 14) according to a second embodiment of the present invention. The carton 350 may have at least two dispensing configurations. The blank 208 may be generally similar in size and shape to the blank 8 illustrated in FIG. 1, and the carton 350 may accordingly be of generally similar in size and shape to the carton 150 illustrated in FIG. 5. Like elements in FIGS. 13-16 are therefore provided with similar reference numbers to those of FIGS. 1-12, with the reference numbers in FIGS. 13-16 being preceded by a "2" or "3." The carton 350, however, includes a dispenser 300 that may simply be removed in order to place the carton 350 in a variety of dispensing configurations.

Figure 14:
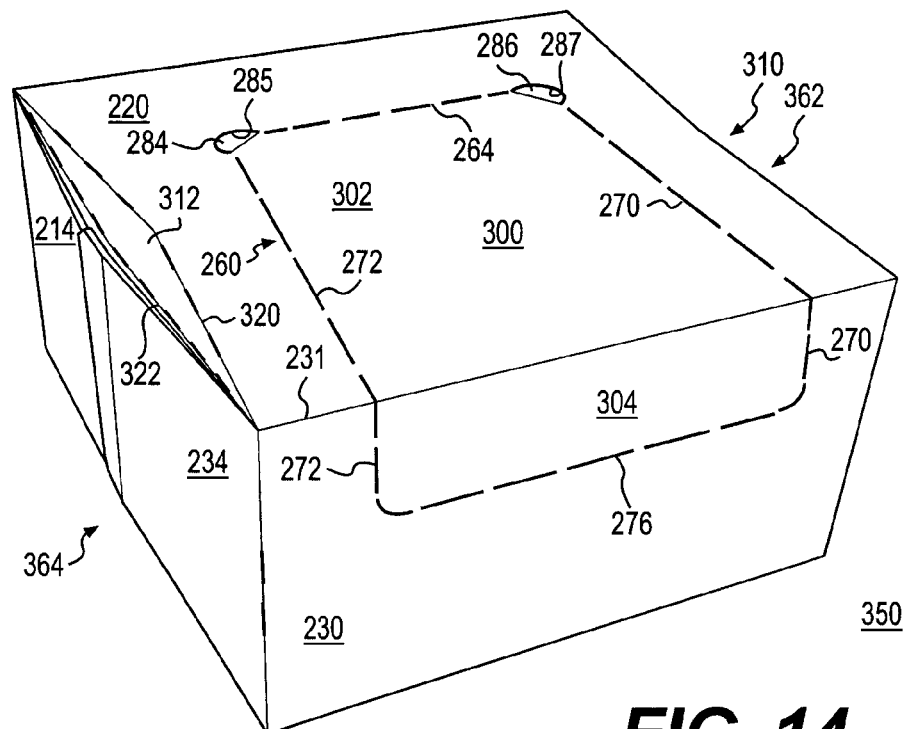
FIG. 14 is a perspective view of the second carton embodiment.

According to one aspect of the second embodiment, the blank 208 may include a dispenser pattern 260 that defines a dispenser 300 in the erected carton 350 (illustrated in FIG. 14). In the illustrated embodiment, the dispenser pattern 260 includes tear lines 262, 264, 266, 268, 270, 272, 276 in the top panel 220 and front panel 230. One or more of the tear lines 262, 264, 266, 268, 270, 272, 276 can be, for example, scores or spaced slits that extend through all or a part of the thickness of the blank 208. For example, the tear lines 270, 272, 276 can extend from the outer or print surface of the blank 208 and partially or wholly through the thickness of the blank 208. The tear lines 262, 266, 268 can extend from the inner surface of the blank 208 and partially or wholly through the thickness of the blank 208. The tear line 264 is a cut-space line, although other breachable lines of disruption can be used to form any of the lines 262, 264, 266, 268, 270, 272, 276.

The carton 350 can be constructed from the blank 208 in a manner similar to the carton 150. FIG. 14 is a perspective view of the carton 350 before the carton is placed in its dispensing configuration. The dispenser 300 extends across the top panel 220 and the front panel 230.

Figure 15:
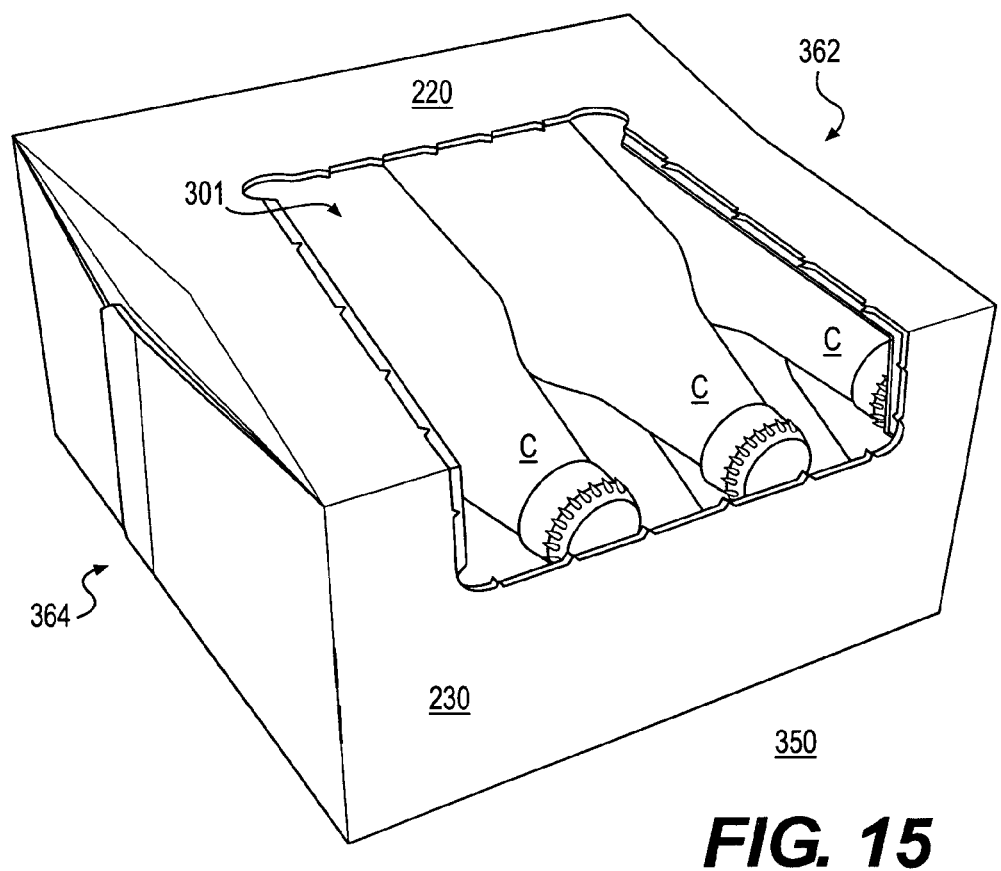
FIG. 15 illustrates the second carton embodiment in a horizontal dispensing configuration.
Figure 16:
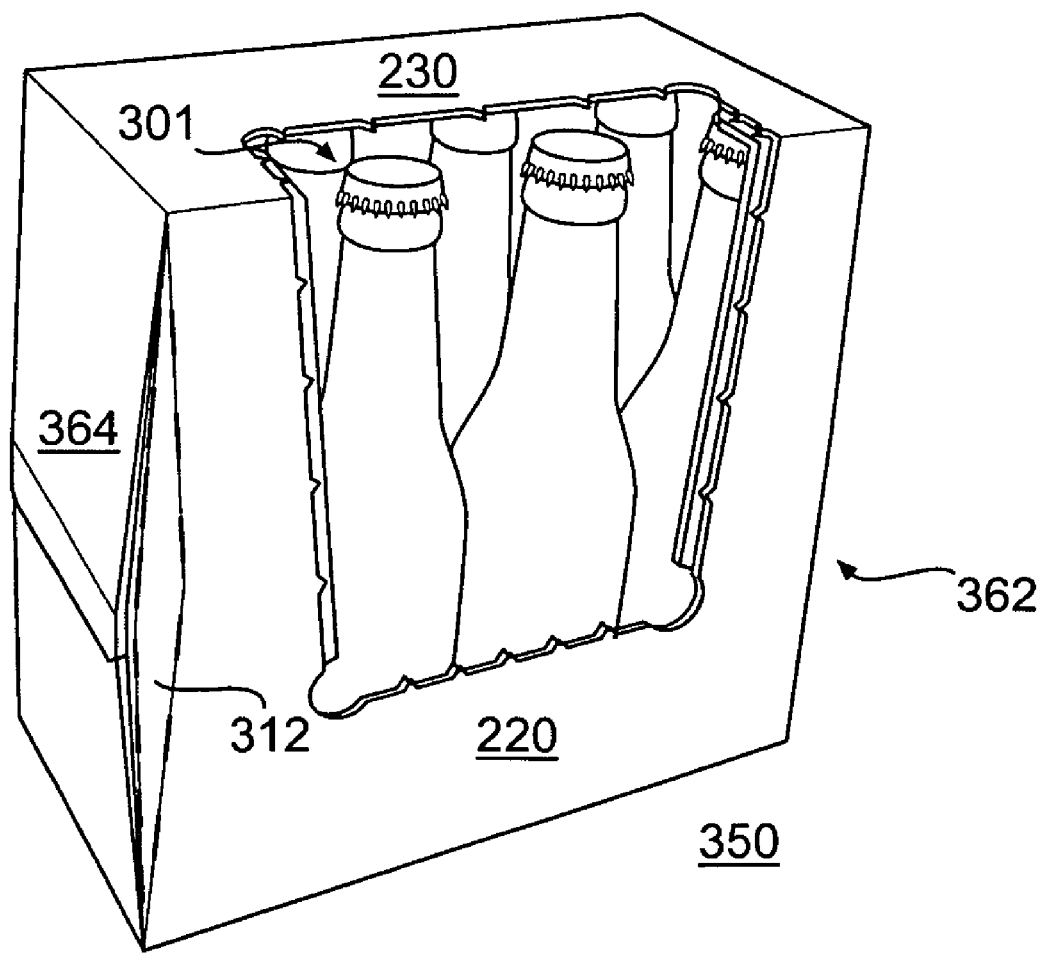
FIG. 16 illustrates the second carton embodiment in an upright dispensing configuration.

FIG. 15 illustrates the carton 350 resting on the bottom panel 240 in a "horizontal" dispensing configuration. The carton 350 may be opened and placed in a dispensing configuration by tearing the dispenser 300 away from the carton 350 along the dispenser pattern 260. Tearing may be initiated, for example, at either of the tabs 284, 286 in the top panel 220. After the dispenser 300 is at least partially torn away, a dispenser opening 301 is left in the carton 350. FIG. 16 illustrates the carton 350 in an alternative "vertical" or "upright" dispensing configuration in which it rests on the back panel 210. The long axes of the exemplary containers C are aligned with the length of the dispenser opening 301, allowing easy removal of the containers C.

According to the present embodiment, the carton 350 provides ease of access to containers C held within the carton once the carton 350 is placed in its dispensing configuration. The opened carton 350 can be positioned and accessed in different dispensing configurations, which is convenient if the storage space for the carton is constricted in a specific dimension. For example, the carton 350 can be stored in a short storage space in the horizontal dispensing configuration. For a shallow or narrow storage space, such as, for example, a refrigerator door, the upright dispensing configuration can be used. The opened carton 350 also allows a consumer a view of substantially all of the carton contents.

Figure 17:
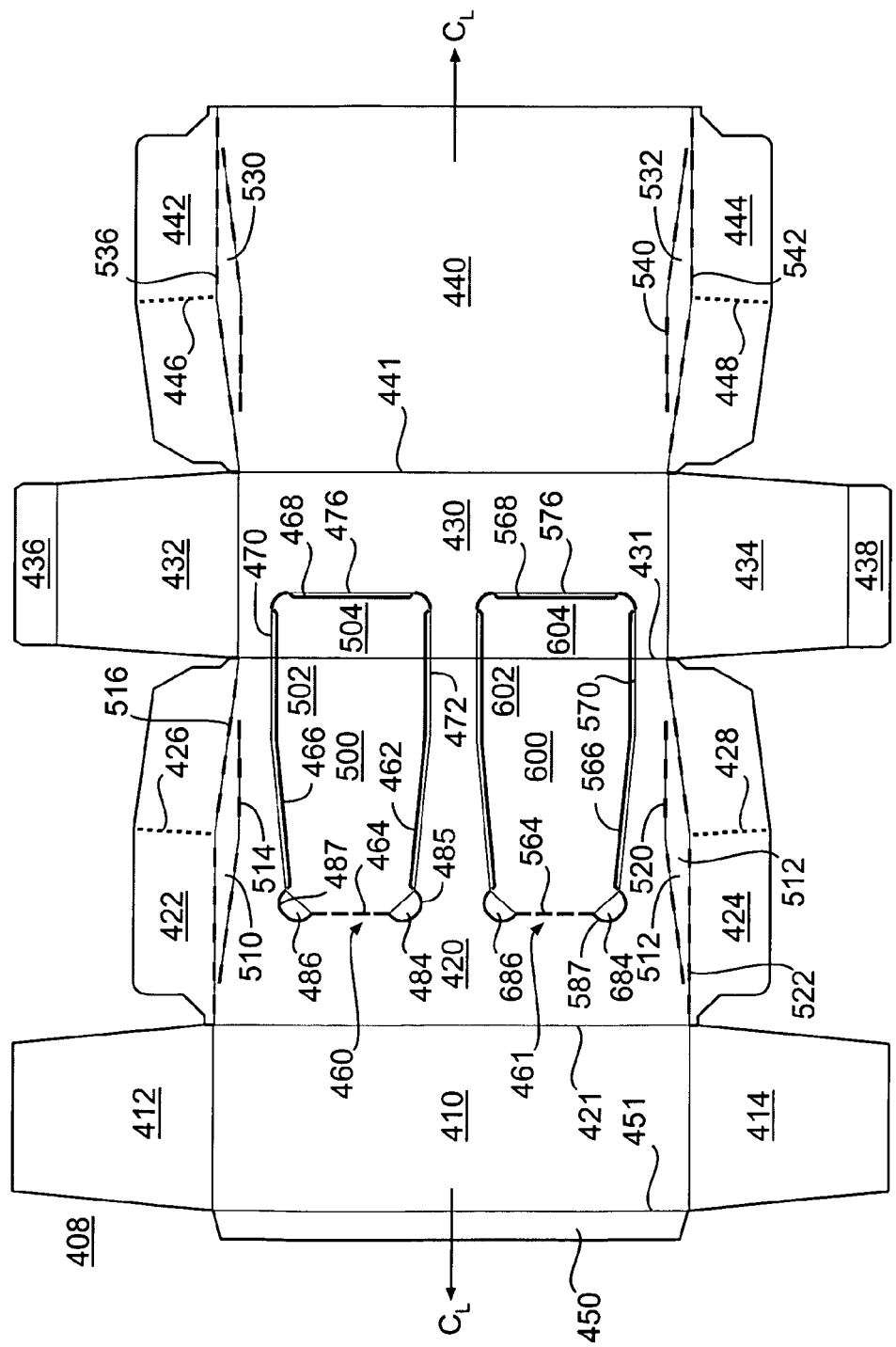
FIG. 17 is a plan view of a blank used to form a carton according to a third embodiment of the invention.
Figure 18:
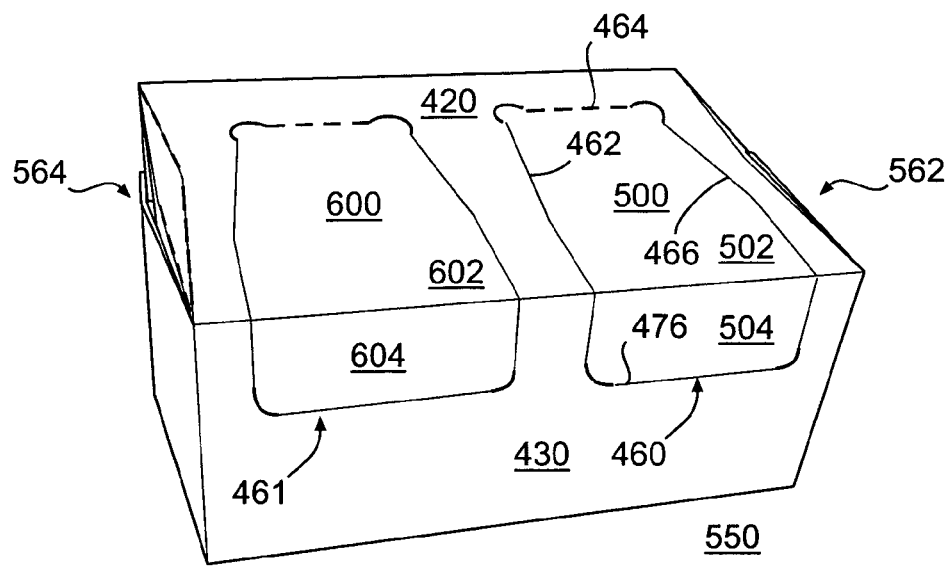
FIG. 18 is a perspective view of the third carton embodiment.

FIG. 17 is a plan view of a blank 408 used to form a carton 550 (illustrated in FIG. 18) according to a third embodiment of the present invention. The blank 408 may be generally similar in size and shape to the blanks 8, 208 illustrated in FIG. 13, and the carton 550 may accordingly be of generally similar in size and shape to the cartons 150, 350. Like elements in FIGS. 17-20 are therefore provided with similar reference numbers to those of FIGS. 13-16, with the reference numbers in FIGS. 17-20 being preceded by a "4," "5" or "6." The carton 550 includes a two separate dispenser 500, 600 that may be individually removed in order to place the carton 550 in different dispensing configurations.

Referring to FIG. 17, the blank 408 includes first and second dispenser patterns 460, 461 that define first and second dispensers 500, 600 that may be generally symmetric to one another about a longitudinal center line $C_L$. The first and second dispensers 500, 600 in the blank 408 may be generally similar in shape and function to the dispenser 300 shown in FIG. 13.

Figure 20:
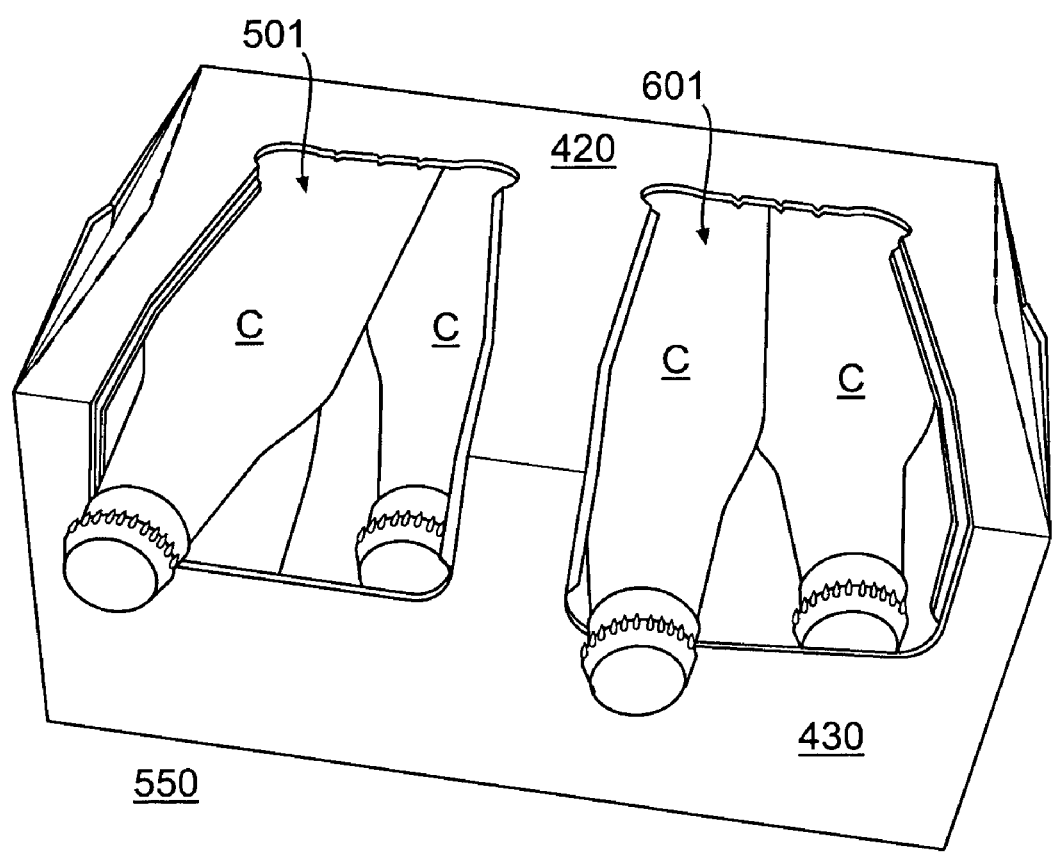
FIG. 20 illustrates the third carton embodiment in a horizontal dispensing configuration.

The blank 408 can be erected into the carton 550 in a manner similar to the cartons 150, 350 discussed above. FIG. 20 is a perspective view of the erected carton 550. The dispensers 500, 600 each extend across the top panel 420 and the front panel 430 of the carton 550.

Figure 19:
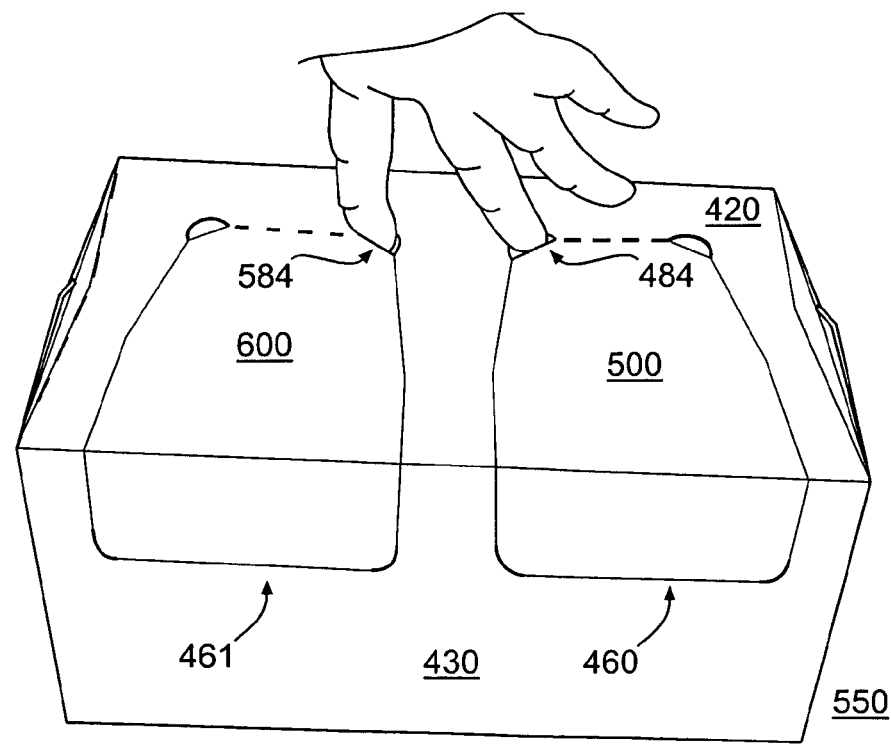
FIG. 19 illustrates the third carton embodiment being placed in a dispensing configuration.

FIGS. 19 and 20 illustrate the carton 550 being placed in a dispensing configuration. The dispensers 500, 600 may be opened, for example, at the tabs 484, 584 and torn along the dispenser patterns 460, 461, respectively. Each of the dispensers 500, 600 may be opened individually, or both may opened to obtain the configuration shown in FIG. 20. Containers C may be withdrawn through the dispenser openings as shown in FIG. 20. The carton 550 may dispense either in an "upright" position by pivoting the carton 350 so that it is supported on the back panel 410, or in the "horizontal" position shown in FIG. 20.

In the above embodiments, the dimensions of the blanks may be altered, for example, to accommodate various container forms. The dispenser embodiments of this invention can, for example, be embodied by cartons containing bottles, cans, combinations thereof, or other containers. The number and arrangement of containers may also be varied.

The blanks according to the present invention can be, for example, formed from coated paperboard, SUS board, and similar materials. For example, the interior and/or exterior sides of the blanks can be coated with a clay coating. The clay coating may then be printed over with product, advertising, price coding, and other information or images. The blanks may then be coated with a varnish to protect any information printed on the blanks. The blanks may also be coated with, for example, a moisture barrier layer, on either or both sides of the blanks. The blanks can also be laminated to or coated with one or more sheet-like materials at selected panels or panel sections.

For purposes of the description presented herein, the term "line of disruption" can be used to generally refer to, for example, a cut line, a crease line, a tear line, or a fold line (or combinations thereof) formed in a blank. A "breachable" line of disruption is a line of disruption that is intended to be breached during ordinary use of the carton. An example of a breachable line of disruption is a tear line.

In accordance with the above-described embodiments of the present invention, a fold line can be any substantially linear, although not necessarily straight, line of disruption or other form of weakening that facilitates folding therealong.

In the present specification, a "panel" or "flap" need not be flat or otherwise planar. A "panel" or "flap" can, for example, comprise a plurality of interconnected generally flat or planar sections.

The above embodiments may be described as having one or more panels adhered together by glue. The term "glue" is intended to encompass all manner of adhesives commonly used to secure carton panels in place.

The description is not intended to limit the invention to the form disclosed herein. Also, it is intended that the appended claims be construed to include alternative embodiments, not explicitly defined in the detailed description.

What is claimed:

1. A carton, comprising:
   a back panel;
   a top panel;
   a front panel;
   a bottom panel;
   a first end panel;
   a second end panel; and
   a dispenser/stand pattern disposed in the top panel and the front panel and defining a dispenser/stand, the carton being capable of being placed in a dispensing configuration in which the dispenser/stand provides a dispenser opening and supports the carton in an inclined position, wherein
   the dispenser/stand pattern defines a top dispenser/stand panel and a plurality of foldably connected front dispenser/stand panels, the front dispenser/stand panels being connected along at least one transverse fold line, and
   the plurality of front dispenser/stand panels is connected to the top dispenser/stand panel along a first transverse fold line and to the front panel along a second transverse fold line, the plurality of front dispenser/stand panels being connected to the front panel along the second transverse fold line when the dispenser/stand supports the carton in an inclined position.

2. The carton of claim 1, wherein the plurality of front dispenser/stand panels comprises at least three foldably connected front dispenser/stand panels.

3. The carton of claim 2, wherein the dispenser stand pattern allows the dispenser/stand to be torn away from the top panel and from parts of the front panel while remaining foldably attached to the front panel.

4. The carton of claim 2, further comprising at least one retaining feature in the bottom panel, the at least one retaining feature being sized and arranged to engage a portion of the dispenser/stand.

5. The carton of claim 1, further comprising:
   a first diamond corner panel between the top panel and the first end panel; and
   a second diamond corner panel between the top panel and the second end panel.

6. The carton of claim 5, wherein the first end panel comprises a plurality of first end flaps and the second end panel comprises a plurality of second end flaps.

7. The carton of claim 6, further comprising a plurality of containers accommodated in the carton, the containers having long axes extending generally parallel to the top panel.

8. The carton of claim 5, wherein the dispenser/stand pattern defines at least one tab cutout.

9. The carton of claim 1, further comprising a plurality of containers accommodated in the carton, the containers having long axes extending generally parallel to the top panel.

10. A method of placing a carton in a dispensing configuration, comprising:
    providing a carton according to claim 4;
    tearing the top dispenser/stand panel away from the top panel;
    tearing the front dispenser/stand panels away from a portion of the front panel so that the front dispenser/stand panels remain attached to the front panel; and
    engaging the dispenser/stand with the at least one retaining feature.

11. A carton blank, comprising:
    a back panel;
    a top panel;
    a front panel;
    a bottom panel;
    at least one first end flap;
    at least one second end flap; and
    a dispenser/stand pattern disposed in the top panel and the front panel and defining a dispenser/stand, a carton formed from the blank being capable of being placed in a dispensing configuration in which the dispenser/stand provides a dispenser opening and supports the carton in an inclined position, wherein
    the dispenser/stand pattern defines a top dispenser/stand panel in the top panel and a plurality of foldably connected front dispenser/stand panels in the front panel,
    the front dispenser/stand panels are connected along at least one transverse fold line, and
    the plurality of front dispenser/stand panels is connected to the top dispenser/stand panel along a first transverse fold line and to the front panel along a second transverse fold line, the plurality of front dispenser/stand panels being connected to the front panel along the second fold line when the dispenser/stand supports a carton formed from the blank in an inclined position.

12. The blank of claim 11, wherein the dispenser/stand pattern allows the dispenser/stand to be torn away from the top panel and from parts of the front panel while remaining foldably attached to the front panel.

13. The blank of claim 12, further comprising at least one retaining feature in the bottom panel, the at least one retaining feature being sized and arranged to engage a portion of the dispenser/stand.

14. The blank of claim 12, further comprising:
    a first diamond corner panel between the top panel and the first end panel; and
    a second diamond corner panel between the top panel and the second end panel.

15. The blank of claim 12, wherein the dispenser/stand pattern defines at least one tab cutout in the top panel.

16. A carton and a plurality of bottles, comprising:
    a back panel;
    a top panel;
    a front panel;

a bottom panel;
a first end panel;
a second end panel;
a first diamond corner panel between the top panel and the first end panel;
a second diamond corner panel between the top panel and the second end panel;
a first dispenser pattern disposed in the top panel and the front panel and defining a dispenser/stand, the carton being capable of being placed in a dispensing configuration in which the dispenser/stand provides a dispenser opening and supports the carton in an inclined position, and is connected to the front panel along a fold line when the dispenser/stand supports the carton in an inclined position; and
a plurality of bottles, each bottle having a long axis extending generally parallel to the top panel.

17. The carton and a plurality of bottles of claim 16, wherein the dispenser pattern defines a top dispenser panel in the top panel and a front dispenser panel in the front panel.

18. The carton and a plurality of bottles of claim 17, wherein the first end panel comprises a plurality of first end flaps and the second end panel comprises a plurality of second end flaps.

19. The carton and a plurality of bottles of claim 16, further comprising a second dispenser pattern defining a second dispenser in the top and front panels.

20. A method of placing a carton in a dispensing configuration, comprising:
  providing a carton and plurality of bottles according to claim 17;
  tearing the top dispenser panel away from the top panel; and
  tearing the front dispenser panel away from a portion of the front panel.

21. The method of claim 20, further comprising resting the carton on the bottom panel to dispense bottles.

22. The method of claim 20, further comprising resting the carton on the back panel to dispense bottles.

23. A carton blank, comprising:
  a back panel;
  a top panel;
  a front panel foldably connected to the top panel;
  a bottom panel;
  at least one first end flap;
  at least one second end flap; and
  a first diamond corner panel between the top panel and the at least one first end flap;
  a second diamond corner panel between the top panel and the at least one second end flap; and
  a first dispenser pattern disposed in the top panel and the front panel and defining a dispenser/stand, wherein the dispenser pattern defines a top dispenser/stand panel in the top panel and a front dispenser/stand panel in the front panel, and the dispenser/stand provides a dispenser opening and supports a carton formed from the carton blank in an inclined position, and is connected to the front panel along a fold line when the dispenser/stand supports the carton in an inclined position.

24. The blank of claim 23, further comprising a second dispenser pattern defining a second dispenser in the top and front panels.

25. A carton and a plurality of bottles, comprising:
  a back panel;
  a top panel;
  a front panel;
  a bottom panel;
  a first end panel;
  a second end panel;
  a dispenser pattern disposed in the top panel and the front panel and defining a dispenser/stand, the carton being capable of being placed in a dispensing configuration in which the dispenser/stand provides a dispenser opening and supports the carton in an inclined position, and is connected to the front panel along a fold line when the dispenser/stand supports the carton in an inclined position;
  a first diamond corner panel between the top panel and the first end panel;
  a second diamond corner panel between the top panel and the second end panel;
  a third diamond corner panel between the bottom panel and the first end panel; and
  a fourth diamond corner panel between the bottom panel and the second end panel; and
  a plurality of bottles, each bottle having a long axis extending generally parallel to the top panel, a base adjacent to the back panel, and a top portion adjacent to the front panel.

26. The carton and a plurality of bottles of claim 25, wherein the bottles are bottles arranged in two rows and at least four columns.

27. A carton, comprising:
  a back panel;
  a top panel;
  a front panel;
  a bottom panel;
  a first end panel;
  a second end panel; and
  a dispenser/stand pattern disposed in the top panel and the front panel and defining a dispenser/stand, the carton being capable of being placed in a dispensing configuration in which the dispenser/stand provides a dispenser opening and supports the carton in an inclined position, wherein
  the dispenser/stand pattern defines a top dispenser/stand panel and at least three foldably connected front dispenser/stand panels, the front dispenser/stand panels being connected along transverse fold lines, and
  the plurality of front dispenser/stand panels is connected to the top dispenser/stand panel along a transverse fold line.

28. The carton of claim 27, wherein the dispenser stand pattern allows the dispenser/stand to be torn away from the top panel and from parts of the front panel while remaining foldably attached to the front panel.

29. The carton of claim 27, further comprising at least one retaining feature in the bottom panel, the at least one retaining feature being sized and arranged to engage a portion of the dispenser/stand.

30. The carton of claim 27, further comprising:
  a first diamond corner panel between the top panel and the first end panel; and
  a second diamond corner panel between the top panel and the second end panel.

31. The carton of claim 30, wherein the first end panel comprises a plurality of first end flaps and the second end panel comprises a plurality of second end flaps.

32. The carton of claim 31, further comprising a plurality of containers accommodated in the carton, the containers having long axes extending generally parallel to the top panel.

33. The carton of claim 30, wherein the dispenser/stand pattern defines at least one tab cutout.

34. A carton blank, comprising:
a back panel;
a top panel;
a front panel;
a bottom panel;
at least one first end flap;
at least one second end flap; and
a dispenser/stand pattern disposed in the top panel and the front panel and defining a dispenser/stand, wherein the dispenser/stand pattern defines a top dispenser/stand panel in the top panel and a plurality of foldably connected front dispenser/stand panels in the front panel, wherein
the front dispenser/stand panels are connected along at least one transverse fold line, and
the plurality of front dispenser/stand panels is connected to the top dispenser/stand panel along a transverse fold line,
the dispenser/stand pattern allowing the dispenser/stand to be torn away from the top panel and from parts of the front panel while remaining foldably attached to the front panel,
a first diamond corner panel between the top panel and the first end panel, and
a second diamond corner panel between the top panel and the second end panel.

* * * * *